F. H. HARDIN.
SPRING SUSPENSION SYSTEM FOR RAILWAY TRUCKS.
APPLICATION FILED DEC. 17, 1915.
1,211,939.
Patented Jan. 9, 1917.
2 SHEETS—SHEET 1.
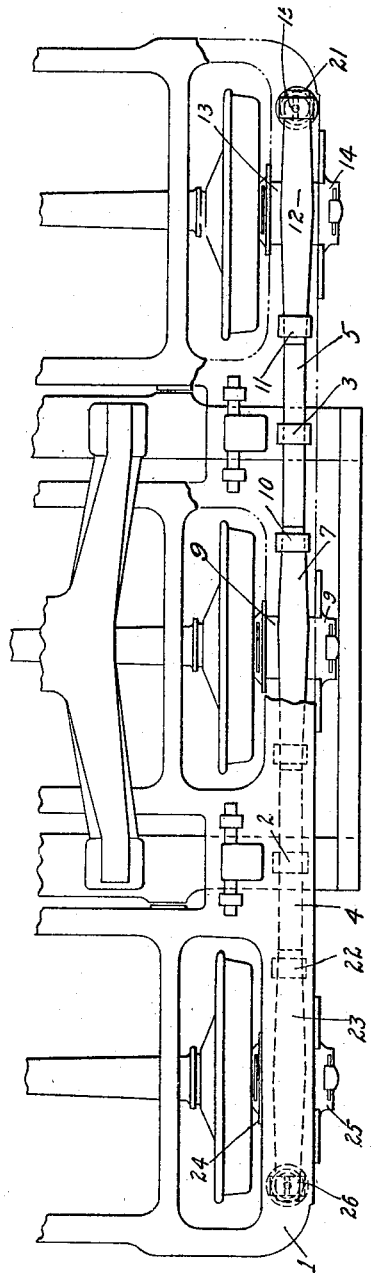
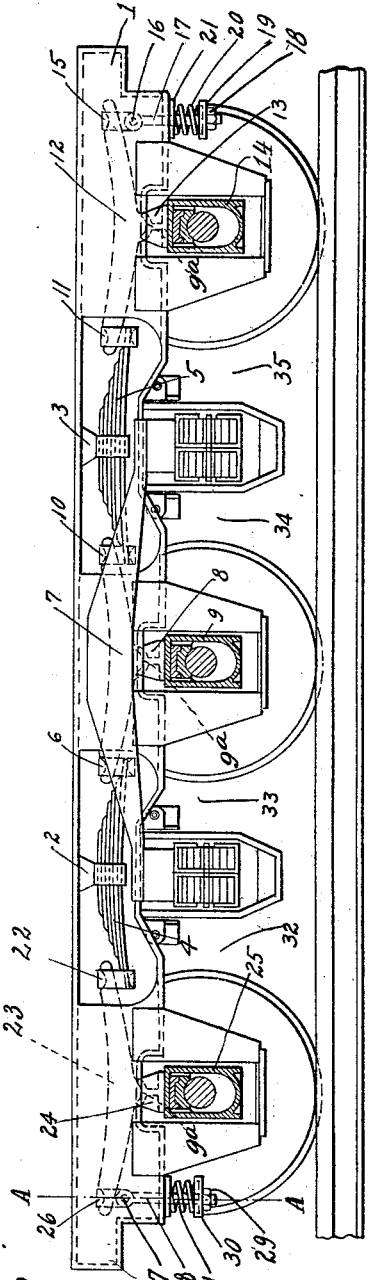
WITNESSES:
INVENTOR.
Frank H. Hardin
BY
Myron F. Hill
ATTORNEYS.

F. H. HARDIN.
SPRING SUSPENSION SYSTEM FOR RAILWAY TRUCKS.
APPLICATION FILED DEC. 17, 1915.
1,211,939.
Patented Jan. 9, 1917.
2 SHEETS—SHEET 2.
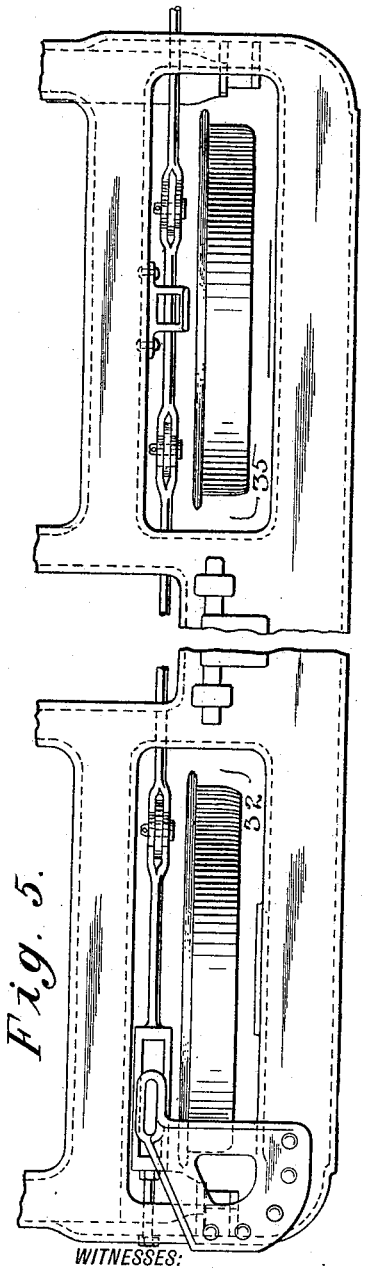
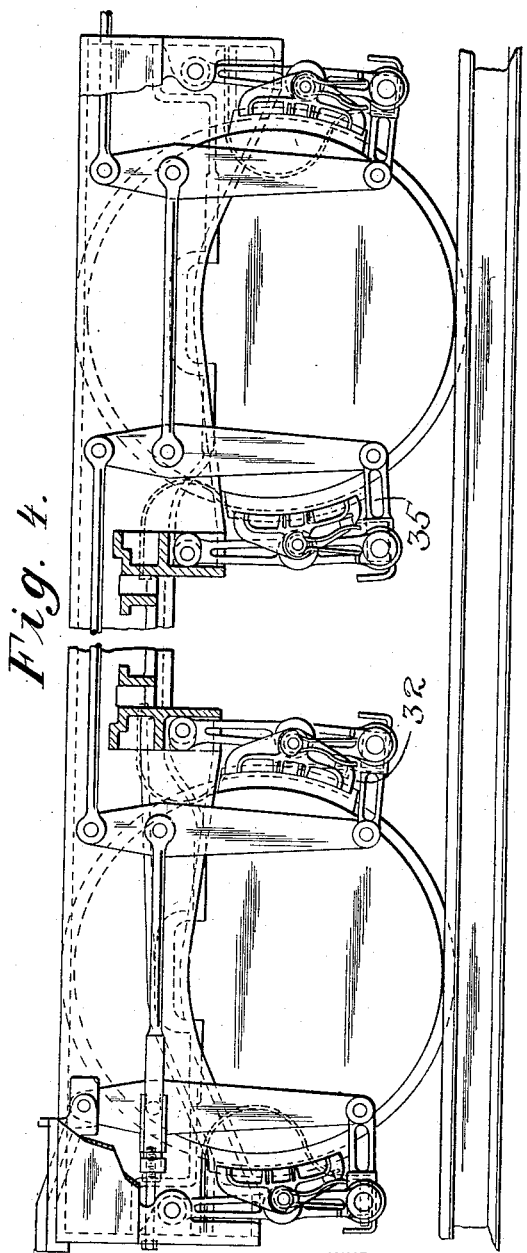

UNITED STATES PATENT OFFICE.

FRANK HAMMOND HARDIN, OF WHITE PLAINS, NEW YORK.

SPRING SUSPENSION SYSTEM FOR RAILWAY-TRUCKS.

1,211,939. Specification of Letters Patent. Patented Jan. 9, 1917.

Application filed December 17, 1915. Serial No. 67,471.

*To all whom it may concern:*

Be it known that I, FRANK H. HARDIN, citizen of the United States, and resident of White Plains, in the county of Westchester and State of New York, have invented certain new and useful Improvements in Spring Suspension Systems for Railway-Trucks, of which the following is a specification.

My invention relates to trucks for railroad cars.

It relates particularly to railway trucks of the four or six wheel type to be used on passenger coaches, dining and private cars and is applicable also to trucks for freight cars.

The object of the invention is to provide means whereby the car body is suspended on the truck frame in such a manner as to communicate the weight equally to the several journal bearings; to absorb the vibration or shock incident to the movement of the wheels over the tracks and prevent its communication to the car body; and thus to provide for the movement of said cars at high speeds in perfect safety and without undue vibration to the car body. In modern steel car construction in particular, the bodies of cars are heavier than formerly and stiffer springs have had to be employed. Track irregularities have caused an increase of the shaking and vibration of the car bodies as a result, so that any improvement which reduces this vibration is of importance.

My invention comprises a system of springs and equalizers so arranged as to distribute the shocks due to track irregularities in such a way as to affect the car body to the least possible degree.

A further object of the invention is to provide means whereby the brake rigging and running gear of the trucks are readily accessible for maintenance and repair, this being accomplished by the location of the spring equalizing system along the top of the wheels.

The spring systems in the two sides of the truck are symmetrical, preferably, but the two systems act independently of each other.

In the drawings: Figure 1 is a side elevation with parts in section of a railway truck employing one form of my invention. Fig. 2 is a plan view of one side of such a truck, the other half of which is preferably symmetrical therewith. Fig. 3 is a section on the line A—A, Fig. 1. Fig. 4 shows the location of the wheel brakes in side elevation. Fig. 5 shows the location in plan view of their operating rods.

In the truck, a frame 1 is provided on each side with supports 2 and 3, each resting and balanced, that is, pivotally resting intermediate their ends upon the middle of a leaf spring 4 or 5. One end of the leaf spring 4 is connected by means of a spring hanger or shackle 6 to one end of an equalizing lever 7 preferably non-resilient, pivotally resting upon the saddle 8 of a journal box 9. This pivotal support may consist of a concave surface 9ª in the saddle fitting a corresponding convex surface on the equalizing lever. The other end of the equalizing lever 7 is connected by means of the spring hanger 10 to one end of the leaf spring 5. The other end of the leaf spring 5 is connected by the spring hanger 11 to one end of the equalizing lever 12 preferably non-resilient, which is pivotally mounted on the saddle 13 resting upon the journal box 14. The other end of the equalizing lever 12 is connected by the spring hanger 15, the pivot 16, rod 17, nut 18 and spring cap 19 to the helical spring 20, the other end of which abuts against the under side of a portion of the frame 1 or against a block 21 resting against or forming part of the frame, thereby furnishing an additional point of support. The other end of the leaf spring 4 is connected by a spring hanger 22 to one end of the equalizing lever 23 preferably non-resilient which is pivotally mounted on the saddle 24, resting on the journal box 25. The other end of the equalizing lever 23 is connected by the spring hanger 26, pivot 27, rod 28, nut 29 and spring cap 30 to the bottom of the helical spring 21, the top of which supports the end of the frame 1 preferably through the cap 32 secured to the bottom of the frame.

In spring suspension systems for trucks, springs have been used in place of the equalizing levers herein shown and equalizing levers have been used in place of springs. The objection to such an arrangement is that the vibrations communicated to the wheels from the tracks are communicated to the frame of the truck in a greater degree than by my arrangement. Equalizing levers are more effective in suppressing the heavier vibrations than are springs owing to their sluggish action. The mounting of the equalizing levers therefore upon the axles has the result of suppressing the heavier vibrations at this point and leaves the springs to perform the lighter work. Moreover, in the spring suspension system above referred to, one end of a spring for an end axle was connected directly to the truck frame and the other end of the spring to one end of the equalizing lever so that upon one side of an end axle there was one half of an elliptical spring only to suppress vibrations upon that side and on the other side of the axle, the other half of the elliptical spring and one half of an equalizing lever, said one half of the equalizing lever counterbalanced by another half of an elliptical spring mounted upon the next axle. This arrangement was uneven.

In my system, upon one side of an end axle is one half of an equalizing lever and a helical spring; and on the other side of the axle is the other half of the equalizing lever and half of an elliptical spring. This provides a more flexible and more evenly balanced spring connection between the axle and the truck than in the system above mentioned. The other portions of the truck are preferably such as are customarily used with this model, and the truck frame may even constitute or form part of the bottom construction of the car body.

The frame of the truck while it is hollow and adapted to be replaced or repaired with ease is thus supported at each side upon the four points 2, 3, 21 and 32 and the weight and vibration are distributed in two directions through the equalizing levers which rest upon the axles and through the springs to the truck.

When a four-wheel truck is used, the strap hanger 15 and its coiled spring connections may be substituted for the strap hanger 10 and its connections; and the support 3, the leaf spring 5 and the equalizing lever 12 and its mountings may be omitted.

My invention is not limited to the use of leaf springs or helical springs or to the positions shown, since any other suitable forms of springs may be employed instead in suitable positions. The springs are preferably directly connected to the equalizing members to avoid the inertia of any nonresilient connection.

It will be noted that the equalizing levers and the leaf springs are located along the upper sides of the wheels of the truck, and above the spaces 32, 33, 34 and 35 suitable for the location of brake rigging, so that the latter are left easily accessible for repairs.

The brake rigging is shown in Figs. 4 and 5. The spaces 32 and 35 are shown in these figures and the brake devices there located. They consist of the usual brake shoe outfits 36, 37 and 38 and lever systems 39, 40 and 41 to operate them. The open spaces in the truck leave these members easily accessible from the side of the track and make replacements and repairs easy without reaching or crawling under the car.

My invention is capable of many variations in details and forms of construction.

What I claim is:

1. In a spring suspension system for a railway car having car supports and wheels, a plurality of axle supports, an equalizing member balanced upon each axle support and spring members directly connecting both ends of each equalizing member to said car supports.

2. In a spring suspension system for a railway car having car supports and wheels, a plurality of axle supports, an equalizing member balanced upon each axle support, a leaf spring connecting one end of said equalizing member to support said car and a helical spring connecting the other end of said member to support said car.

3. In a spring suspension system for a railway car having car supports and wheels, a plurality of equalizing members balanced upon axle supports, spring members directly connecting both ends of each equalizing member to said car supports, said spring members being located along the upper sides of wheels mounted on said axles and above the customary brake rigging on said wheels.

4. In a spring suspension system for a railway car having car supports and wheels, a plurality of axle supports, an equalizing member balanced upon each axle support, a leaf spring connecting one end of said equalizing member to support said car, a helical spring connecting the other end of said lever to support said car, said spring members being located along the upper sides of wheels mounted on said axles and above the customary brake rigging on said wheels.

5. In a spring suspension system for a railway truck having wheels, a plurality of axle supports, a non-resilient pivoted equalizing lever balanced upon each axle support and metal spring members having a range of movement sufficient to accommodate service vibration connecting both ends of an equalizing lever to supports on said truck.

6. In a spring suspension system for a railway car having car supports and wheels, a plurality of axle supports, a non-resilient pivoted equalizing lever balanced upon each axle support, a leaf spring connecting one end of said equalizing lever to support said car and a metal helical spring connecting the other end of said lever to support said car.

7. In a spring suspension system for a railway truck, a plurality of axle supports, a non-resilient pivoted equalizing lever balanced upon each axle support, a leaf spring connecting one end of said equalizing lever to support said truck and a metal helical spring having a range of movement sufficient to accommodate service vibration connecting the other end of said lever to support said truck.

8. In a spring suspension system for a railway truck, a plurality of axle supports, a non-resilient pivoted equalizing lever balanced upon each axle support, metal spring members having a range of movement sufficient to accommodate service vibration connecting both ends of the equalizing levers to supports on said truck, said spring members being located along the upper sides of wheels mounted on said axles and above the customary brake rigging on said wheels.

9. In a spring suspension system for a railway car having car supports and wheels, a plurality of axle supports, a non-resilient pivoted equalizing lever balanced upon said axle supports, a leaf spring connecting one end of equalizing levers on two axle supports to support said car, a helical spring connecting the other end of said levers to support said car, said spring members being located along the upper sides of the wheels and above the customary brake rigging on said wheels.

10. In a spring suspension system for a railway car having car supports and wheels, a plurality of axle supports, a non-resilient pivoted equalizing lever balanced upon each axle support, spring members connecting both ends of an equalizing lever to said car supports, said levers and some of said springs being located within a hollow side frame on said truck.

11. In a spring suspension system for a railway truck having wheels, a plurality of axle supports, a non-resilient pivoted equalizing lever balanced upon each axle support, spring members connecting both ends of an equalizing lever to supports on said truck, said springs being located within a hollow side frame on said truck.

12. In a spring suspension system for a railway car having car supports and wheels, a plurality of axle supports, a non-resilient pivoted equalizing lever balanced upon each axle support, a leaf spring connecting one end of two of said equalizing levers to support said car, a helical spring connecting the other end of said two levers to support said car, said levers and leaf springs being located within a hollow side frame on said truck.

13. In a spring suspension system for a railway truck having wheels, a plurality of axle supports, a non-resilient pivoted equalizing lever balanced upon each axle support, spring members connecting both ends of said levers to support said truck, said levers and some of said spring members being located along the upper sides of the wheels above the customary brake rigging on said wheels and located within a hollow side frame on said truck.

14. In a spring suspension system for a railway car having car supports and wheels, a plurality of axle supports, a non-resilient pivoted equalizing lever balanced upon each axle support, a leaf spring connecting one end of each equalizing lever to support said car, a helical spring connecting the two farthest ends of said levers to support said car, said leaf spring members being located along the upper sides of wheels mounted on said axles and above the customary brake rigging on said wheels and located within a hollow side frame on said truck.

15. In a spring suspension system for a railway car having car supports and wheels, a plurality of axle supports, a non-resilient pivoted equalizing lever balanced upon each axle support, a spring connecting one end of an equalizing lever to support said car and a helical spring connecting the other end of said lever to support said car, said helical spring having a range of movement sufficient to accommodate service vibration.

16. In a spring suspension system for a railway truck having wheels, a plurality of axle supports, a non-resilient pivoted equalizing lever balanced upon each axle support, spring members connecting both ends of said equalizing lever to supports on said truck including a leaf spring connecting one end of an equalizing lever to support said truck and a metal spring having a range of movement sufficient to accommodate service vibration connecting the other end of said lever to support said truck.

17. In a spring suspension system for a railway car having car supports and wheels, a plurality of axle supports, a non-resilient pivoted equalizing lever balanced upon each axle support, a leaf spring connecting one end of an equalizing lever to support said car and a helical spring connecting the other end of said lever to support said car, said helical spring having a range of movement sufficient to accommodate service vibration.

18. In a railway truck, sets of axles and wheels, nonresilient levers supported, one upon each end of each of said axles, leaf springs connecting each two of the adjacent ends of said equalizing levers to said truck in order to support the same upon the said ends, and metallic spring members having a range of movement sufficient to accommodate service vibration connecting the two extreme ends of said equalizing levers to said truck frame to support the said truck frame upon the said ends.

19. In a railway truck, sets of axles and wheels, levers supported, one upon each end of each of said axles, leaf springs connecting each two of the adjacent ends of said equalizing levers to said truck in order to support the same upon the said ends, and metallic spring members having a range of movement sufficient to accommodate service vibration connecting the two extreme ends of said equalizing levers to the said truck frame to support the said truck upon the said ends.

20. In a railway truck, sets of axles and wheels, levers supported, one upon each end of each of said axles, leaf springs connecting each two of the adjacent ends of said equalizing levers to said truck in order to support the same upon the said ends, and helical spring members having a range of movement sufficient to accommodate service vibration connecting the two extreme ends of said equalizing levers to the said truck frame to support the said truck upon the said ends.

21. In a railway truck, sets of axles and wheels, nonresilient levers supported, one upon each end of each of said axles, leaf springs connecting each two of the adjacent ends of said equalizing levers to said truck in order to support the same upon the said ends, and helical spring members having a range of movement sufficient to accommodate service vibration connecting the two extreme ends of said equalizing levers to the said truck frame to support the said truck upon the said ends.

Signed at New York in the county of New York and State of New York.

FRANK HAMMOND HARDIN.

Witnesses:
MYRON F. HILL,
R. B. KENDIG.

Copies of this patent may be obtained for five cents each, by addressing the "Commissioner of Patents, Washington, D. C."